United States Patent [19]
Bogar

[11] Patent Number: 5,627,512
[45] Date of Patent: May 6, 1997

[54] SEAT BELT SAFETY ALARM

[76] Inventor: Marcia M. Bogar, 51 Spokane Apt. 11, Pontiac, Mich. 48341

[21] Appl. No.: 485,280

[22] Filed: Jun. 7, 1995

[51] Int. Cl.$^6$ ..................................................... B60Q 1/00
[52] U.S. Cl. ..................................... 340/457.1; 340/457
[58] Field of Search ................................ 340/457.1, 573, 340/457; 280/801.1; 29/3; 24/163 R, 166, 168; 180/268; 200/61.58 B

[56] References Cited

U.S. PATENT DOCUMENTS 5,406,252  4/1995  Dear ..................................... 340/457.1

*Primary Examiner*—Jeffery Hofsass
*Assistant Examiner*—Sihong Huang

[57] ABSTRACT

A seat belt safety alarm comprised of a housing having a slotted opening in a side thereof. The housing has a heel secured therein adjacent to the slotted opening. The slotted opening is adapted to receive a seat belt tongue therein with the tongue fitting over the heel. The housing has a wall therein inwardly of the heel. A battery is secured within the housing. A circuit board is secured within the housing disposed above the battery. The circuit board has a wire electrically coupled with the battery. A speaker is secured within the top of the housing disposed above the circuit board. The speaker has a wire coupled to the circuit board. A tongue is secured to a side of the housing. The tongue is adapted for coupling with a seat belt buckle. A sensor switch is secured within the housing. The sensor switch has a wire coupled with the circuit board. The sensor switch has a switch portion extending outwardly of the housing disposed above the first end of the tongue.

7 Claims, 3 Drawing Sheets

SEAT BELT SAFETY ALARM

BACKGROUND OF THE INVENTION

1. Field of the Invention

The present invention relates to a seat belt safety alarm and more particularly pertains to preventing a child from disengaging a seat belt with a seat belt safety alarm.

2. Description of the Prior Art

The use of safety belt systems is known in the prior art. More specifically, safety belt systems heretofore devised and utilized for the purpose of providing warning signals within a seat belt buckle are known to consist basically of familiar, expected and obvious structural configurations, notwithstanding the myriad of designs encompassed by the crowded prior art which have been developed for the fulfillment of countless objectives and requirements.

By way of example, U.S. Patent Number to Matsuoka et al. discloses a safety alarm system for an automatic seat belt.

U.S. Pat. No. 4,727,358 to Burt,III discloses a substitute warning device for automobile seat belt reminder alarm.

U.S. Pat. No. 5,317,305 to Campman discloses a personal alarm device with vibrating accelerometer motion detector and planar piezoelectric hi-level sound generator.

U.S. Pat. No. 5,006,832 to Beaudry discloses a pocket alarm.

U.S. Pat. No. 5,330,228 to Krebs et al. discloses a safety restraint for motor vehicles.

U.S. Pat. No. 4,518,174 to Sedlmayr discloses an apparatus for adjusting the height of the fixing or guide fitting for the shoulder belt of a safety belt system.

While these devices fulfill their respective, particular objective and requirements, the aforementioned patents do not describe a seat belt safety alarm for preventing a child from disengaging a seat belt.

In this respect, the seat belt safety alarm according to the present invention substantially departs from the conventional concepts and designs of the prior art, and in doing so provides an apparatus primarily developed for the purpose of preventing a child from disengaging a seat belt.

Therefore, it can be appreciated that there exists a continuing need for new and improved seat belt safety alarm which can be used for preventing a child from disengaging a seat belt. In this regard, the present invention substantially fulfills this need.

SUMMARY OF THE INVENTION

In the view of the foregoing disadvantages inherent in the known types of safety belt systems now present in the prior art, the present invention provides an improved seat belt safety alarm. As such, the general purpose of the present invention, which will be described subsequently in greater detail, is to provide a new and improved seat belt safety alarm and method which has all the advantages of the prior art and none of the disadvantages.

To attain this, the present invention essentially comprises a housing having a front, a rear, a top, a bottom, a left side, a right side, and an interior. The left side has a slotted opening therein. The interior has a heel secured therein adjacent to the slotted opening. The slotted opening is adapted to receive an existing seat belt tongue therein with the tongue fitting over the heel. The interior has a ledge secured therein disposed above the slotted opening. The interior has a wall therein inwardly of the heel. The right side has an opening formed therein. The opening has a door removably coupled thereto. The device contains a clamp having a first end and a second end. The first end is secured within the top of the housing. The second end extends into the interior of the housing through the ledge thereof. The second end has a plate secured thereto. The clamp adjusts the plate up or down between the ledge and the heel of the housing. A battery is secured within the opening formed in the right side of the housing. A circuit board is secured within the interior of the housing disposed above the battery. The circuit board has a wire electrically coupled with the battery. The circuit board has a sensitivity adjustment screw extending outwardly of the top of the housing. A speaker is secured within the top of the housing disposed above the circuit board. The speaker has a wire coupled to the circuit board. A tongue is secured to the right side of the housing. The tongue has a first end and a second end. The first end is adapted for coupling with a seat belt buckle. The second end extends within the interior of the housing. The second end has a U-shaped portion secured thereto with a furthestmost portion overlapping the wall within the interior. The furthestmost portion and the wall have a spring therebetween. A rheostat is secured between the furthestmost portion of the U-shaped portion of the tongue and the wall of the interior. The rheostat has a wire coupled with the circuit board. A sensor switch is secured within the interior against the right side of the housing. The sensor switch has a wire coupled with the circuit board. The sensor switch has a switch portion extending outwardly of the right side of the housing disposed above the first end of the tongue.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved seat belt safety alarm which has all the advantages of the prior art safety belt systems and none of the disadvantages.

It is another object of the present invention to provide a new and improved seat belt safety alarm which may be easily and efficiently manufactured and marketed.

It is a further object of the present invention to provide a new and improved seat belt safety alarm which is of durable and reliable construction.

An even further object of the present invention is to provide a new and improved seat belt safety alarm which is susceptible of a low cost of manufacture with regard to both materials and labor, and which accordingly is then susceptible of low prices of sale to the consuming public, thereby making such a seat belt safety alarm economically available to the buying public.

Still yet another object of the present invention is to provide a new and improved seat belt safety alarm which provides in the apparatuses and methods of the prior art some of the advantages thereof, while simultaneously overcoming some of the disadvantages normally associated therewith.

Even still another object of the present invention is to provide a new and improved seat belt safety alarm for preventing a child from disengaging a seat belt.

Lastly, it is an object of the present invention to provide a new and improved seat belt safety alarm comprised of a housing having a slotted opening in a side thereof. The housing has a heel secured therein adjacent to the slotted opening. The slotted opening is adapted to receive a seat belt tongue therein with the tongue fitting over the heel. The housing has a wall therein inwardly of the heel. A battery is secured within the housing. A circuit board is secured within the housing disposed above the battery. The circuit board has a wire electrically coupled with the battery. A speaker is secured within the top of the housing disposed above the circuit board. The speaker has a wire coupled to the circuit board. A tongue is secured to a side of the housing. The tongue is adapted for coupling with a seat belt buckle. A sensor switch is secured within the housing. The sensor switch has a wire coupled with the circuit board. The sensor switch has a switch portion extending outwardly of the housing disposed above the first end of the tongue.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
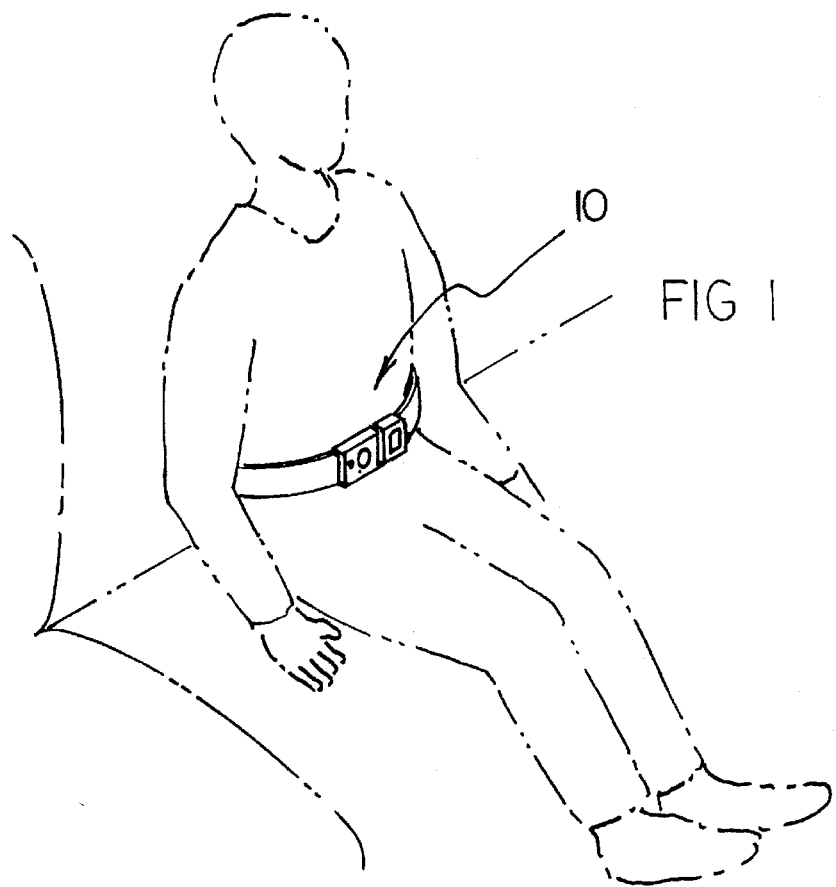
FIG. 1 is a perspective view of the present invention in place around a child.
Figure 2:
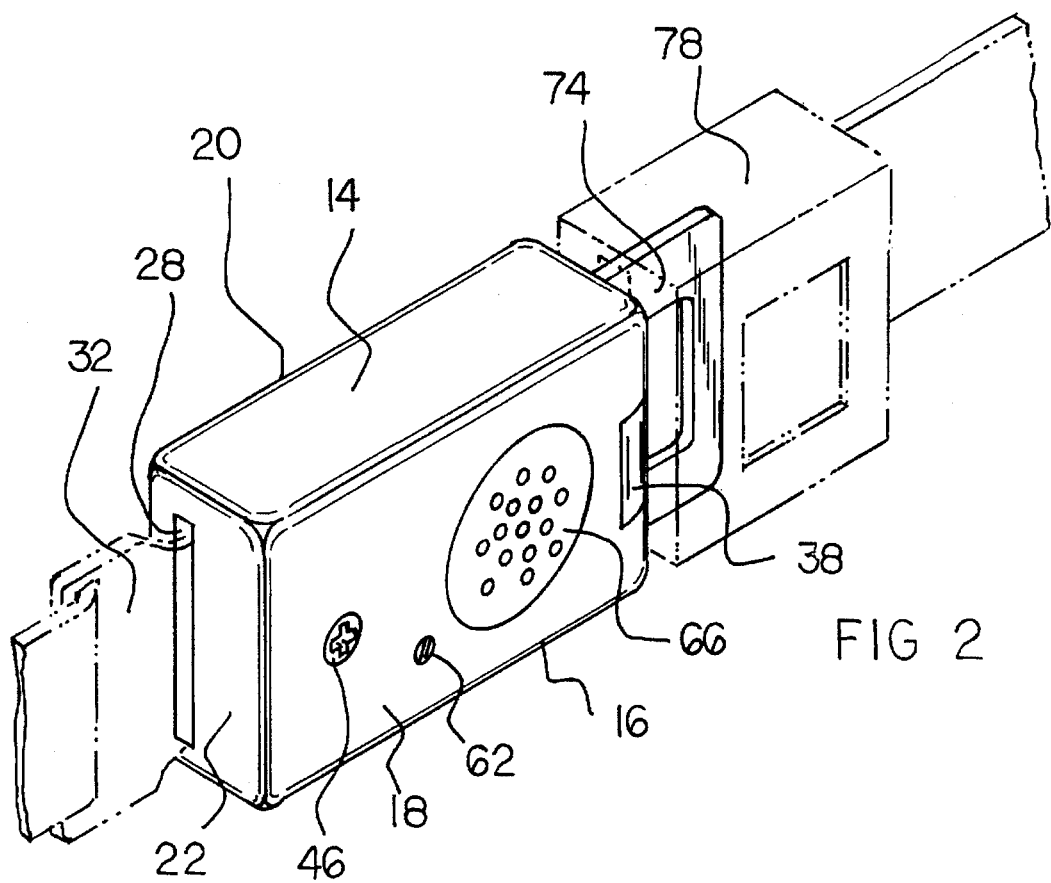
FIG. 2 is a perspective view of the preferred embodiment of the seat belt safety alarm constructed in accordance with the principles of the present invention.
Figure 3:
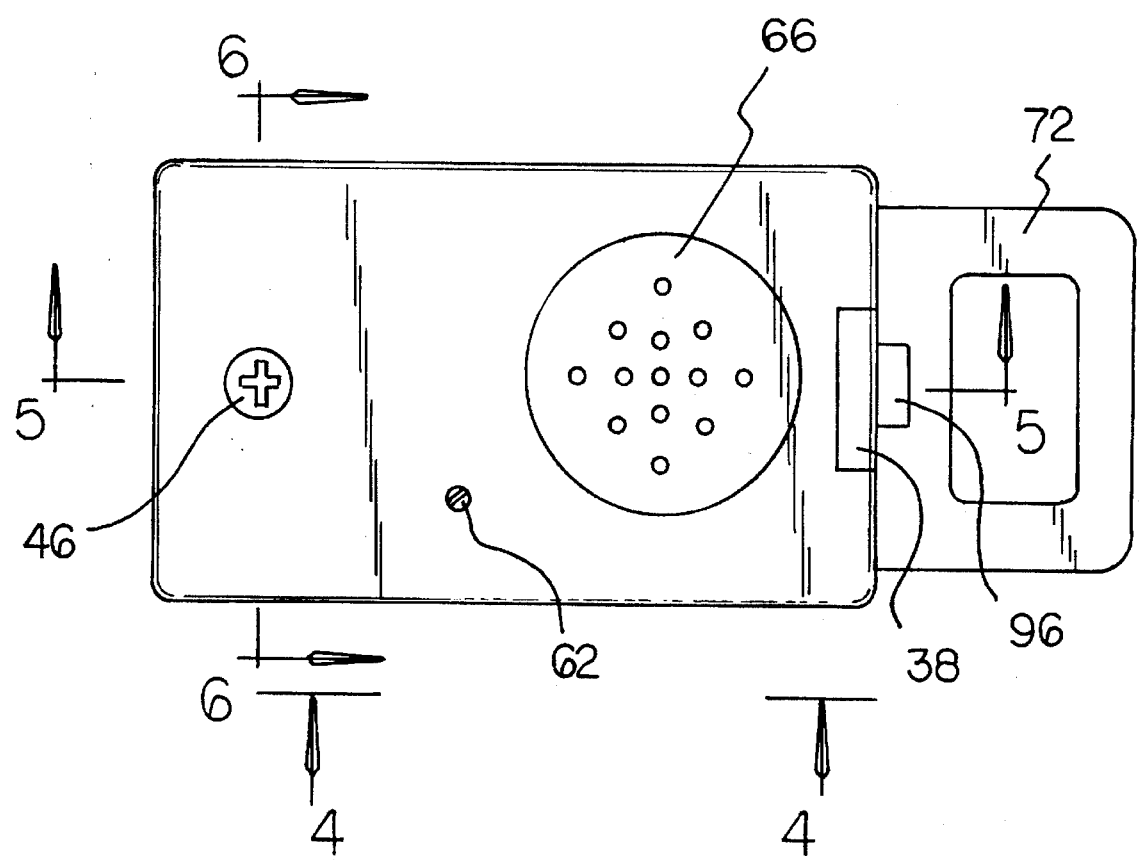
FIG. 3 is a front elevation view of the present invention.
Figure 4:
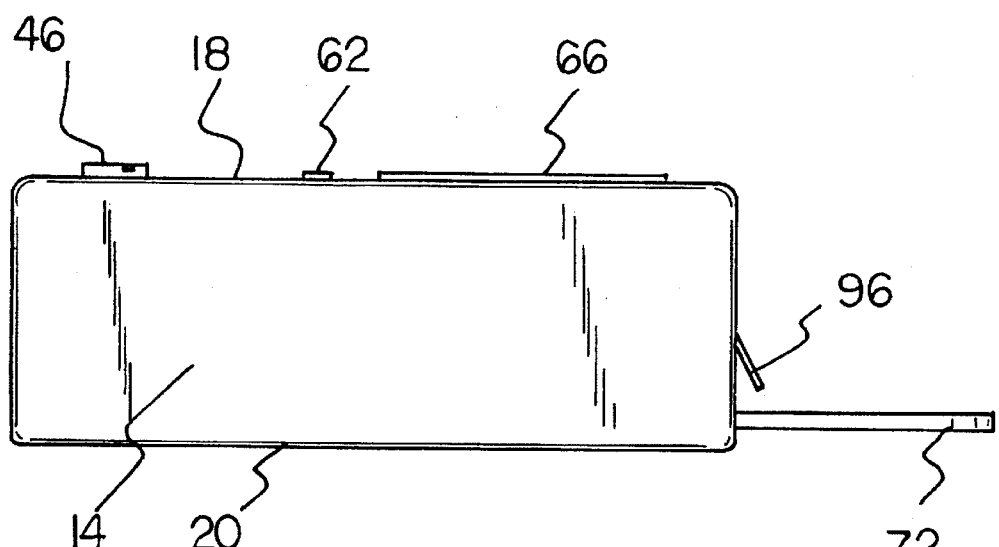
FIG. 4 is a side elevation view of the present invention.
Figure 5:
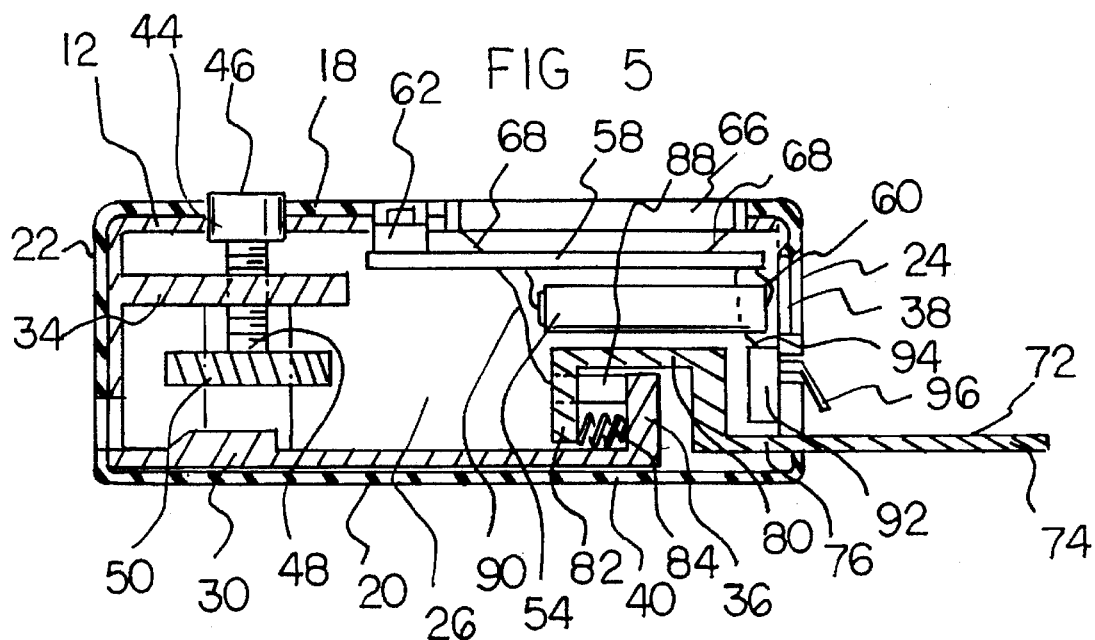
FIG. 5 is a cross-sectional view as taken along line 5—5 of FIG. 3.
Figure 6:
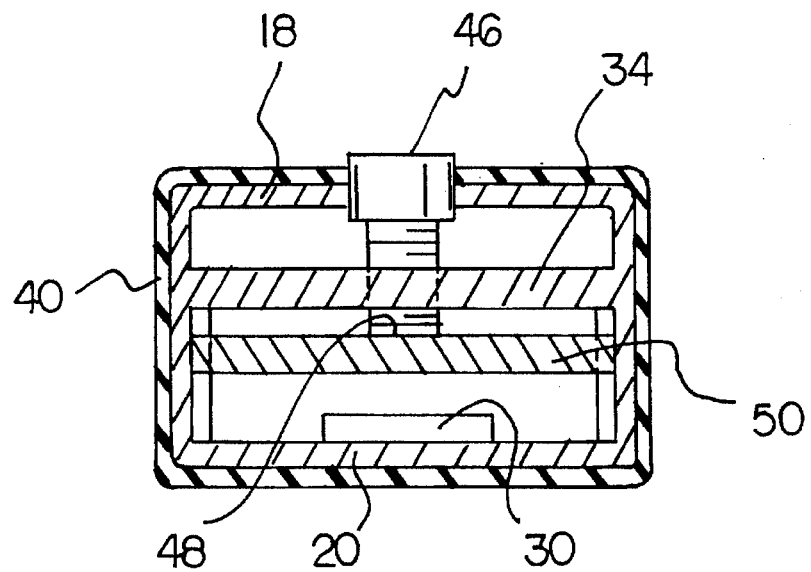
FIG. 6 is a cross-sectional view as taken along line 6—6 of FIG. 3.

With reference now to the drawings, and in particular, to FIG. 1–6 thereof, the preferred embodiment of the new and improved seat belt safety alarm embodying the principles and concepts of the present invention and generally designated by the reference number 10 will be described.

Specifically, it will be noted in the various Figures that the device relates to a new and improved seat belt safety alarm for preventing a child from disengaging a seat belt. In its broadest context, the device consists of a housing, a clamp, a battery, a circuit board, a speaker, a tongue, a rheostat, and a sensor switch. Such components are individually configured and correlated with respect to each other so as to attain the desired objective.

The first component of the device 10 is a housing 12. The housing 12 has a front 14, a rear 16, a top 18, a bottom 20, a left side 22, a right side 24, and an interior 26. The left side 22 has a slotted opening 28 therein. The interior 26 has a heel 30 secured therein adjacent to the slotted opening 28. The slotted opening 28 is adapted to receive an existing seat belt tongue 32 therein with the tongue 32 fitting over the heel 30. The interior 26 has a ledge 34 secured therein disposed above the slotted opening 28. The interior 26 has a wall 36 therein inwardly of the heel 30. The right side 24 has an opening formed therein. The opening has a door 38 removably coupled thereto. The housing 12 is also equipped with a padded outer layer 40 to protect a child from discomfort while the device 10 is being used.

The second component of the device 10 is a clamp 44. The clamp 44 has a first end 46 and a second end 48. The first end 46 is secured within the top 18 of the housing 12. The second end 48 extends into the interior 26 of the housing 12 through the ledge 34 thereof. The second end 48 has a plate 50 secured thereto. The clamp 44 adjusts the plate 50 up or down between the ledge 34 and the heel 30 of the housing 12. The clamp's 44 primary function is to secure the existing seat belt tongue 32 to the heel 30. This is simply accomplished because the first end 46 of the clamp 44 resembles a screw, therefore, one would simply take a screwdriver to tighten the plate 50 against the heel 30 with the existing seat belt tongue sandwiched in between the two.

The third component of the device 10 is a battery 54. The battery 54 is secured within the opening formed in the right side 24 of the housing 12. The battery 54 is the only power source for the device 10 and can simply changed when needed simply by removing the door 38 to gain access to the interior 26 of the housing 12.

The fourth component of the device 10 is a circuit board 58. The circuit board 58 is secured within the interior 26 of the housing 12 disposed above the battery 54. The circuit board 58 has a wire 60 electrically coupled with the battery 54. The circuit board 58 has a sensitivity adjustment screw 62 extending outwardly of the top 18 of the housing 12. The circuit board 58 is programmed with a variety of sounds ranging from low pitch to high pitch. The sensitivity adjustment screw 62 allows a parent to simply adjust how loud of a pitch that they require with a screwdriver.

The fifth component of the device 10 is a speaker 66. The speaker 66 is secured within the top 18 of the housing 12 disposed above the circuit board 58. The speaker 66 has wires 68 coupled to the circuit board 58. The speaker 66 transmits an audio signal from the circuit board 58.

The sixth component of the device 10 is a tongue 72. The tongue 72 is secured to the right side 24 of the housing 12. The tongue 72 has a first end 74 and a second end 76. The first end 74 is adapted for coupling with a seat belt buckle 78. The second end 76 extends within the interior 26 of the housing 12. The second end 76 has a U-shaped portion 80 secured thereto with a furthestmost portion 82 overlapping the wall 36 within the interior 26. The furthestmost portion 82 and the wall 36 have a spring 84 therebetween. The tongue 72 can be slid within the housing 12. The spring 84 causes the tongue 72 to return to its original position with the furthestmost portion 82 distanced from the wall 36.

The seventh component of the device 10 is a rheostat 88. The rheostat 88 is secured between the furthestmost portion 82 of the U-shaped portion 80 of the tongue 72 and the wall 36 of the interior 26. The rheostat 88 has a wire 90 coupled with the circuit board 58. The rheostat 88 sends a signal to the circuit board 58 when the tongue 72 is pulled on causing the furthestmost portion 82 to press against the rheostat 88. The harder the furthestmost portion 82 presses against the rheostat 88, the louder the signal that the circuit board 58 will transmit through the speaker 66.

The final component of the device 10 is a sensor switch 92. The sensor switch 92 is secured within the interior 26 against the right side 24 of the housing 12. The sensor switch 92 has a wire 94 coupled with the circuit board 58. The sensor switch 92 has a switch portion 96 extending outwardly of the right side 24 of the housing 12 disposed above the first end 74 of the tongue 72. When the tongue 72 is within the seat belt buckle 78 the switch portion 96 is biased inwardly. Once the seat belt buckle 78 is removed from the tongue 72, the switch portion 96 extends outwardly causing the sensor switch 92 to send a signal to the circuit board 58 which in turn transmits an alarming signal through the speaker 66.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A seat belt safety alarm for preventing a child from disengaging a seat belt comprising, in combination:

a housing having a front, a rear, a top, a bottom, a left side, a right side, and an interior, the left side having a slotted opening therein, the interior having a heel secured therein adjacent to the slotted opening, the slotted opening being adapted to receive an existing seat belt tongue therein with the tongue fitting over the heel, the interior having a ledge secured therein disposed above the slotted opening, the interior having a wall therein inwardly of the heel, the right side having an opening formed therein, the opening having a door removably coupled thereto;

a clamp having a first end and a second end, the first end secured within the top of the housing, the second end extending into the interior of the housing through the ledge thereof, the second end having a plate secured thereto, the clamp adjusting the plate up or down between the ledge and the heel of the housing;

a battery secured within the opening formed in the right side of the housing;

a circuit board secured within the interior of the housing disposed above the battery, the circuit board having a wire electrically coupled with the battery, the circuit board having a sensitivity adjustment screw extending outwardly of the top of the housing;

a speaker secured within the top of the housing disposed above the circuit board, the speaker having a wire coupled to the circuit board;

a tongue secured to the right side of the housing, the tongue having a first end and a second end, the first end of the tongue being adapted for coupling with a seat belt buckle, the second end of the tongue extending within the interior of the housing, the second end having a U-shaped portion secured thereto with a furthestmost portion overlapping the wall within the interior, the furthestmost portion and the wall having a spring therebetween;

a rheostat secured between the furthestmost portion of the U-shaped portion of the tongue and the wall of the interior, the rheostat having a wire coupled with the circuit board;

a sensor switch secured within the interior against the right side of the housing, the sensor switch having a wire coupled with the circuit board, the sensor switch having a switch portion extending outwardly of the right side of the housing disposed above the first end of the tongue.

2. A seat belt safety alarm for preventing a child from disengaging a seat belt comprising, in combination:

a housing having a slotted opening in a side thereof, the housing having a heel secured therein adjacent to the slotted opening, the slotted opening being adapted to receive a seat belt tongue therein with the tongue fitting over the heel, the housing having a wall therein inwardly of the heel;

a battery secured within the housing;

a circuit board secured within the housing disposed above the battery, the circuit board having a wire electrically coupled with the battery;

a speaker secured within the top of the housing disposed above the circuit board, the speaker having a wire coupled to the circuit board;

a tongue secured to the right side of the housing, the tongue being adapted for coupling with a seat belt buckle;

a sensor switch secured within the housing, the sensor switch having a wire coupled with the circuit board, the sensor switch having a switch portion extending outwardly of the housing disposed above the first end of the tongue.

3. The safety alarm as described in claim 2 and further including a clamp having a first end and a second end, the first end of the clamp secured within the top of the housing, the second end of the clamp extending into the housing, the second end of the clamp having a plate secured thereto, the clamp adjusting the plate up or down between the ledge and the heel of the housing to secure an existing seat belt within the housing.

4. The safety alarm as described in claim 2 wherein the circuit board having a sensitivity adjustment screw extending outwardly of the top of the housing.

5. The safety alarm as described in claim 2 wherein the tongue having a first end and a second end, the first end being adapted for coupling with a seat belt buckle, the second end extending within the interior of the housing, the second end having a U-shaped portion secured thereto with a furthestmost portion overlapping the wall within the interior, the furthestmost portion and the wall having a spring therebetween.

6. The safety alarm as described in claim 5 and further including a rheostat secured between the furthestmost portion of the U-shaped portion of the tongue and the wall of the housing, the rheostat having a wire coupled with the circuit board.

7. The safety alarm as described in claim 1 wherein the housing being surrounded by an outer padded layer.

* * * * *